United States Patent [19]

Weissert et al.

[11] 4,234,335
[45] Nov. 18, 1980

[54] GAS CLEANING METHOD AND APPARATUS

[75] Inventors: Helmut Weissert, Bochum-Hiltrop; Theodor Niess, Mühlheim-Ruhr; Karl-Rudolf Hegemann, Essen-Bergerhausen, all of Fed. Rep. of Germany

[73] Assignee: Gottfried Bischoff Bau kompl. Gasreinigungs- und Wasserrükkühlanlagen GmbH & Co. Kommanditgesellschaft, Essen, Fed. Rep. of Germany

[21] Appl. No.: 901,107

[22] Filed: Apr. 28, 1978

[30] Foreign Application Priority Data

May 3, 1977 [DE] Fed. Rep. of Germany ....... 2719625

[51] Int. Cl.³ .............................................. C21B 5/00
[52] U.S. Cl. ......................................... 75/41; 55/84; 55/213; 55/226; 60/39.02; 60/39.46 R; 266/89; 266/159; 266/197; 261/DIG. 54
[58] Field of Search ................. 55/226, 240, 213, 210; 75/41, 42; 261/DIG. 54; 60/39.02, 39.46 R; 266/89, 157, 159, 197

[56] References Cited

U.S. PATENT DOCUMENTS

| | | | |
|---|---|---|---|
| 4,007,025 | 2/1977 | Hegemann | 55/226 |
| 4,052,042 | 10/1977 | Hegemann | 55/226 X |
| 4,055,331 | 10/1977 | Hegemann | 55/226 |
| 4,067,557 | 1/1978 | Inubishi et al. | 266/89 |

*Primary Examiner*—Bernard Nozick
*Attorney, Agent, or Firm*—Karl F. Ross

[57] ABSTRACT

A washer having a controlled-gap scrubber is connected to the gas outlet of a pressure blast furnace and an expansion turbine for the recovery of energy is connected downstream of the controlled-gap washer unit while a bypass is connected across the turbine. The system has operating regions A and B on a diagram in which the gas pressure is plotted along the ordinate and the volume rate of flow of gas from said blast furnace is plotted along the abscissa, the region A being defined between the turbine-insertion and the turbine-operating characteristic curves plotted on the diagram, the region B being defined between the turbine-operating characteristic curve and the corrected blast-furnace characteristic curve. The pressure in the blast furnace where the operating point is in region A while the gas traverses the turbine is controlled by varying the gap width of said control-gap washer unit in response to the pressure. The pressure in said blast furnace when the operating point is in the region B is controlled by varying the cross-section of the bypass valve, the gap of the washer being controlled in response to the differential pressure thereacross.

2 Claims, 5 Drawing Figures

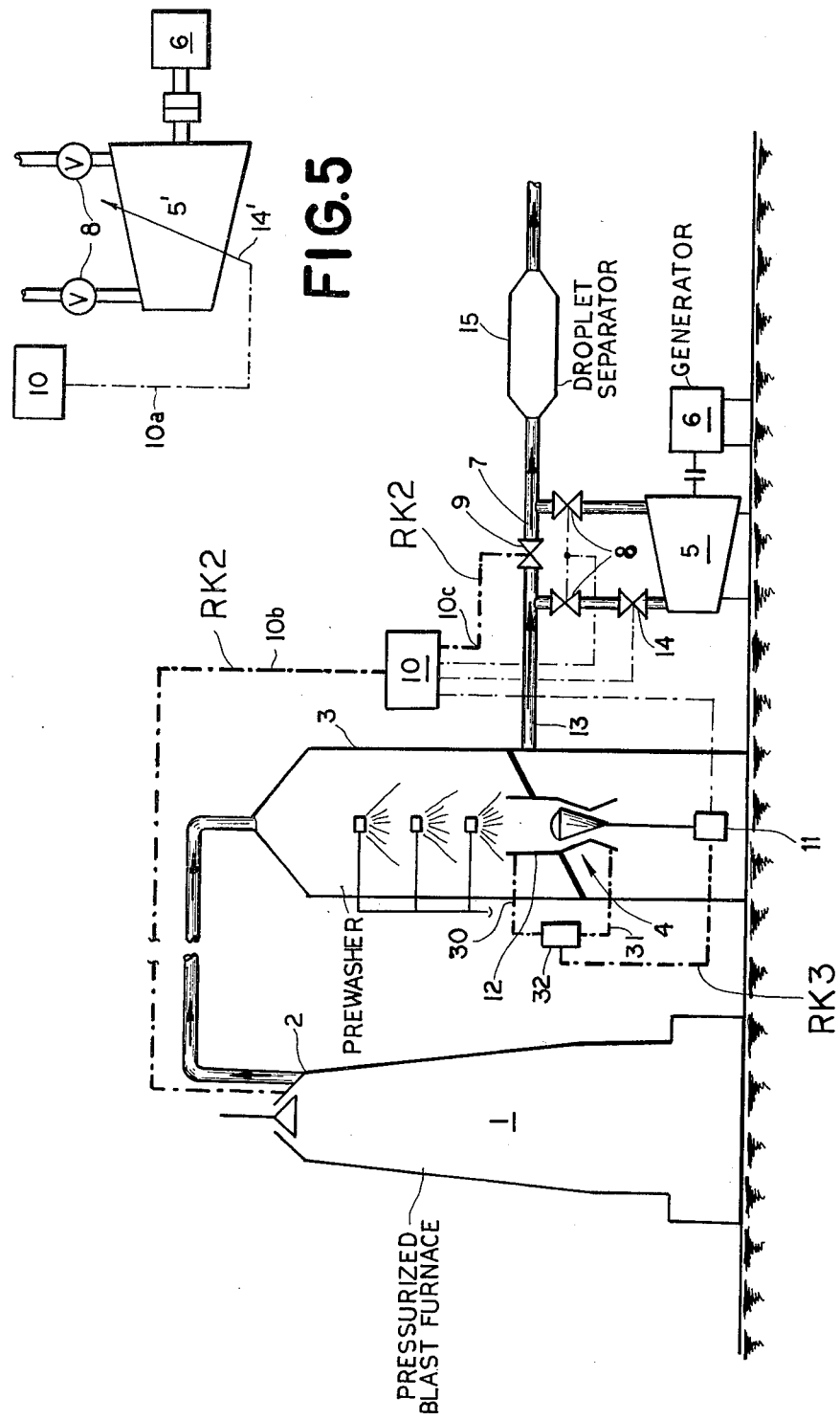

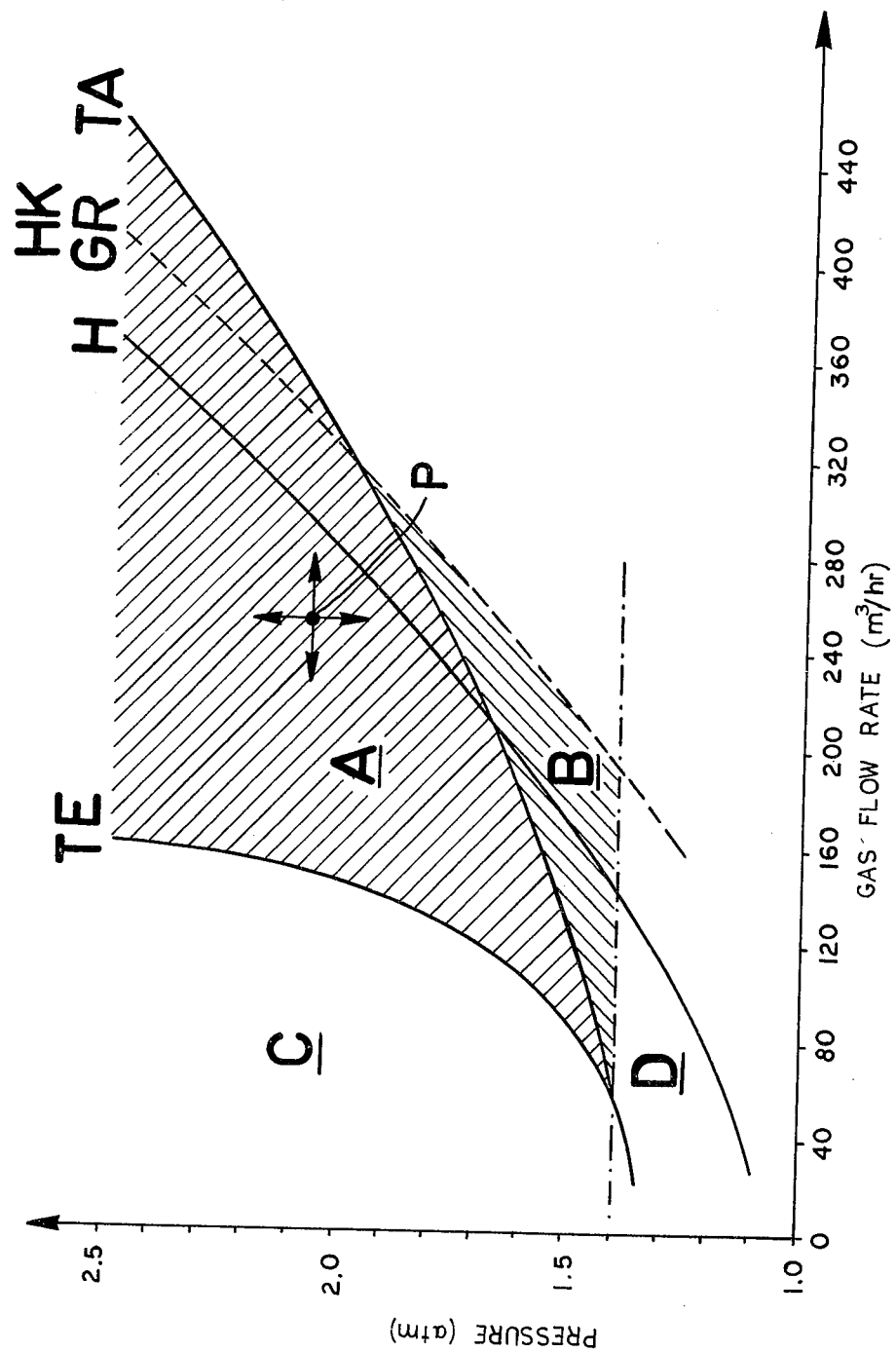

GAS CLEANING METHOD AND APPARATUS

CROSS REFERENCE TO RELATED APPLICATIONS

The present application is related to our copending application Ser. No. 882,421 filed Feb. 28, 1978 (now U.S. Pat. No. 4,152,123 issued May 1, 1979) and commonly assigned with the present case. Application Ser. No. 882,421 is related to another commonly assigned copending application Ser. No. 818,675 filed July 25, 1977 (now U.S. Pat. No. 4,145,193 issued Mar. 20, 1979) in the name of one of the present joint inventors. Ser. No. 818,675 was a continuation-in-part application of Ser. No. 520,920 which has since matured into U.S. Pat. No. 4,007,025. U.S. Pat. No. 4,007,025 issued on an application which was copending with the commonly assigned applications ultimately maturing into U.S. Pat. Nos. 3,854,908, 3,844,744, 3,844,745 and 3,726,065. Reference may also be made to pertinent subject matter in U.S. Pat. No. 4,052,042 and U.S. Pat. No. 3,976,454.

The best art known to us concerning the subject matter of the present case is the art listed above, the references cited in the prosecution files of these applications and in the parallel applications in Germany to which reference may be made below.

FIELD OF THE INVENTION

The present invention relates to an apparatus for the cleaning of the exhaust gases of a blast furnace operated under pressure and, more particularly, to a method of and to an apparatus for the efficient cleaning of the exhaust gases emerging from a pressurized blast furnace using a differential-pressure and annular-gap washer and a turbine installation to recover energy which otherwise may be lost.

BACKGROUND OF THE INVENTION

As will be apparent from the above-listed patents and applications, an exhaust-gas-cleaning installation for the scrubbing of the waste gas of a pressurized blast furnace generally comprises at least the following components:

(a) A wash tower connected to the gas-discharge port of the blast furnace and provided with at least one annular-gap washer whose gap is controllable (controlled-gap washer) and which is responsive to the pressure differential thereacross so that the gap is adjusted in respect to this pressure differential.

(b) An expansion turbine connected to the wash tower for at least partial recovery of energy from the scrubbed gas which is at an elevated pressure, a bypass being provided across this expansion turbine, the turbine unit includes valves for controlling selectively the passage of the gas through the turbine and the bypass.

(c) A control system for the gas pressure at the outlet of the pressurized blast furnace in which the controlled-gap washer constitutes the control element, e.g. with the position of the gap-controlling body of this washer determining the size of the gap and hence the back pressure at the outlet of the blast furnace.

The controlled-gap washing unit can be constituted as a plurality of controlled-gap washers some or each of which may be constituted as an annular-gap washer with a venturi construction, an annular-gap washer in the form of a diffusor washer, or a venturi washers with a corresponding adjustablity. The control of the annular gap width in the annular-gap washer by, for example, the movement of a tapered body in one or another direction, within the venturi constriction, enables control of the pressure differential across the gap and hence of the washing process.

With earlier gas-cleaning apparatus using the controlled-gap washer units described previously, the components of the annular-gap washer are functionally differentiated. A respective controllable-gap washer is provided for each of the two different functions to be performed in the control sense.

The controlled-gap washers are oriented, with respect to the gas flow, either in parallel or in series.

In a parallel connection, a first flow path is provided with a controlled-gap washer connected through a drop separator or the like to the waste-gas duct. In the other flow passage, with an independently functioning controlled-gap washer, there is provided the expansion turbine (see German published application—Auslegeschrift—No. 2,355,457). In this case, the controlled-gap washer of the first path is provided as the exclusive control element for the back pressure at the outlets of the blast furnace, i.e. the control element which exclusively maintains the pressure at the head of the blast furnace constant.

The controlled-gap washer in the other flow path is designed to bring the gas to the desired level of cleanliness for effective use of the expansion turbine, i.e. to minimize deterioration of the turbine. The latter controlled-gap washer, therefore, has a variable-cross-section gap serving only to control the differential washing pressure and hence the washing process.

Where the two functionally distinct controlled-gap washers are connected in tandem or in series, a flow path running to the waste-gas duct is provided and is connected to the last controlled-gap washer while a bypass passage branches from behind the first controlled-gap washer and receives the expansion turbine. Such a system has been described in German published application—Auslegeschrift—No. 2,439,758.

The gas flow through the first controlled-gap washer traverses the expansion turbine after having been scrubbed to the desired degree. The second controlled-gap washer serves at the control element of the circuit for maintaining the gas pressure at the outlet of the pressurized blast furnace constant.

Considerable work with such systems has shown that functionally differentiating the several controlled-gap washers is disadvantageous for many reasons. For example, a plurality of controlled-gap washers must be provided, even if they are only to work alternatively. Surprisingly, even with the differentiation there is always a compromise between the cleaning efficiency and energy recovery of the system in order that that optimum energy recovery and optimum gas cleaning can be obtained simultaneously. In addition, the number of systems which are prone to break down is relatively high and maintenance costs and downtime of the system may be considerable.

To elucidate on this point, it should be noted that a waste-gas cleaning installation of the aforedescribed type has a characteristic gas pressure/gas volume or throughput diagram which can represent the various characteristics of the system. This gas pressure/volume diagram can give, for the expansion turbine, a turbine-insertion characteristic line, a turbine-output (work output) characteristic, a blast furnace characteristic curve and a gas-cleaning characteristic curve which runs parallel to the blast-furnace curve with a distance between the curves determined by the differential pressure of the gas-cleaning operation. The latter value should not fall below a predetermined limit.

The gas-cleaning characteristic curve thus is a transposed replica of the blast-furnace characteristic curve and can also be designated as the "corrected blast-furnace characteristic."

In general and for convenience, in such a diagram, the gas pressure is plotted along the ordinate while the gas volume per hour (throughput) emerging from the pressurized blast furnace is plotted along the abscissa.

All the aforementioned characteristic curves rise from the left-hand corner of the diagram and have their positions on the diagram and relative to one another determined by the operating parameters of the gas-cleaning apparatus and the structure thereof.

Regardless of the particular curve orientations and shapes, the following statements can be made:

(a) The diagram (see FIG. 3) has a region A which lies between the turbine-insertion characteristic curve and the turbine-work output (operating) characteristic curve.

(b) The corrected blast-furnace characteristic curve (gas-cleaning characteristic curve) defines below the turbine-work characteristic curve a region B.

(c) The operating state of the apparatus, when the expansion turbine is operable, can lie a region A or region B and can pass from one region to the other.

(d) The region C to the left of the turbine-insertion characteristic curve will be a region in which the turbine cannot be effectively operated with energy recovery.

(e) Below the region B, moreover, there is a region D in which the expansion turbine will not generate energy and/or in which pressure control is not possible.

The turbine-insertion curve represents pressure/flow-rate values below which the turbine cannot be operated efficiently for energy recovery. The turbine-output characteristic curve represents the pressure/flow-rate values which limit the capacity of the turbine.

In both regions C and D, the expansion turbine must be shut down and the gas-cleaning system operated only to bring about the desired degree of gas cleaning and pressure control at the discharge port of the pressurized blast furnace.

The expansion turbine can be connected to a generator and, in this case, should be driven at a constant speed (as determined by an rpm or angular-velocity controller) if the generator is of the alternating current type and is to have a constant-frequency output. In this case, the expansion turbine can be operated in the region A under a condition in which the volume demand of the turbine exceeds the supply from the pressurized blast furnace. Conversely, the region B of the diagram characterizes the conditions whereby, for a predetermined pressure, the total gas quantity generated by the pressurized blast furnace can no longer be consumed by the turbine.

Because of these relationships, it has, as a practical matter, been difficult if not impossible to provide a satisfactory control of a gas-cleaning installation of the aforedescribed type when the latter is provided with an expansion turbine.

OBJECTS OF THE INVENTION

It is the principal object of the present invention to provide a gas-cleaning installation for the aforedescribed purposes, e.g. for cleaning of the exhaust gas of a pressurized blast furnace, which permits efficient operation under all conditions and thus allows a high degree of cleaning along with good energy recovery to be obtained.

It is another object of the invention to provide an improved method of operating a gas-cleaning installation whereby the disadvantages of earlier systems are avoided.

SUMMARY OF THE INVENTION

The invention is based upon the fact that, in controlling the gas pressure at the outlet of a high-pressure blast furnace, it is necessary to take into consideration the characteristics of the expansion turbine. With each pressure state ahead of the expansion turbine, for a constant turbine speed, there is associated a predetermined gas volume which is given by the turbine-operating characteristics curve. It is this relation, as will be elucidated below, which has given rise to the present invention.

Thus, an aspect of our invention concerns a gas-cleaning apparatus or plant for a pressurized blast furnace which comprises:

a wash tower connected to the outlet of the high-pressure blast furnace and provided with a controlled-gap washer capable of establishing a differential cleaning pressure over a predetermined range;

an expansion turbine connected to the wash tower and provided with a bypass as well as with valves for selectively passing the gas through the turbine and through the bypass;

control means for the gas pressure at the outlet of the high-pressure blast furnace which uses the controlled-gap washer as the control element and is provided with differential-pressure cleaning control; and in the gas-pressure/volume diagram of the installation in which the gas pressure is plotted along the ordinate and the volume rate of flow along the abscissa, the expansion turbine has a turbine-insertion characteristic curve and a turbine-operating characteristic curve, the blast furnace has a blast-furnace characteristic curve and the controlled-gap washer has a gas-cleaning characteristic curve, the region between the turbine characteristic curves being designated A, the corrected blast furnace curve defining a region B below the turbine-operating characteristic curve.

According to the invention, the controlled-gap washer is a functionally nondifferentiated single unit used for controlling the blast-furnace back pressure and the washing pressure and only behind the functionally nondifferentiated controlled-gap washer is the duct connected which includes the expansion turbine and the bypass with the associated valves.

According to an essential feature of the invention, in operation in the region A of the aforementioned diagram, the pressure drop in the controlled-gap washer as well as the pressure drop in the subsequent expansion turbine are so controlled via the controlled-gap washer that the gas volume corresponds to the expansion-turbine requirement for a gas pressure desired at the pressurized blast furnace, the bypass valve being closed. In other words, in state A, the controlled-gap washer performs, by operation of a single control element, namely, the body defining the gap, a control of the volume supplied to the turbine to conform its gas supply to that at which the pressure must be maintained at the outlet of the pressurized blast furnace for effective turbine operation.

When the operating state is in region B of the diagram, the bypass valve is opened and constitutes the exclusive control element, or the main control element, for the pressure at the outlet of the pressurized blast furnace while the controlled-gap washer is operated by another control circuit or system to respond to the pressure differential thereacross for optimum scrubbing.

Naturally, the bypass can be constituted from two or more parallel bypass passages provided with corresponding valves and the expansion turbine can be of adjustable capacity by using a turbine having variable-position rotor or stator blades or vanes. In addition, the control-gap washer may include a plurality of individual washers connected in series or in parallel provided that, in accordance with an essential feature of the invention, the entire assembly is nondifferentiated in the sense that the turbine is connected only through all the washers to the source of pressurized gas.

In the system of the present invention, one can discern two operating states depending upon whether the pressure and volume rate of flow of the gas are in the region A or the region B of the aforementioned diagram. In one state, when the operating point is in region A, the control circuit is effective in a closed condition of the bypass valve to monitor the pressure at the head of the blast furnace and to control the position of the gap-defining element in response thereto. In the second state, when the operating point is in region B, the control circuit responsive to the pressure at the head of the blast furnace varies the cross-section of the bypass valve while an independent control circuit responsive to the pressure differential across the scrubbing gap or gaps controls the position of the gap-defining element or elements exclusively.

The advantage attained with the system of present invention is that it operates with functionally nondifferentiated controlled-gap washers and hence separate and expensive washers for differentiated operation are not necessary. Maintenance is facilitated, efficiency is improved and operating costs are reduced.

Perhaps even more important, optimum energy recovery and flue-gas cleaning can be obtained in all operating states.

BRIEF DESCRIPTION OF THE DRAWING

The above and other features and advantages of the present invention will become more readily apparent from the following description, reference being made to the accompanying drawing in which:

FIG. 2 is a diagram similar to FIG. 1 but in which the heavy lines represent the effective control systems and flow paths when the operating point is in the region B of the diagram of FIG. 3;

FIG. 3 is the aforedescribed diagram in which the pressure at the head of the blast furnace, plotted along the ordinate, and the gas flow rate in units of volume by unit of time, plotted along the abscissa, are given along with the characteristics of the turbine and the scrubber;

FIG. 5 is a view similar to FIG. 4 showing another modification of the systems of FIGS. 1 and 2 which may be used with or without the modification of FIG. 4.

SPECIFIC DESCRIPTION

Figure 1:
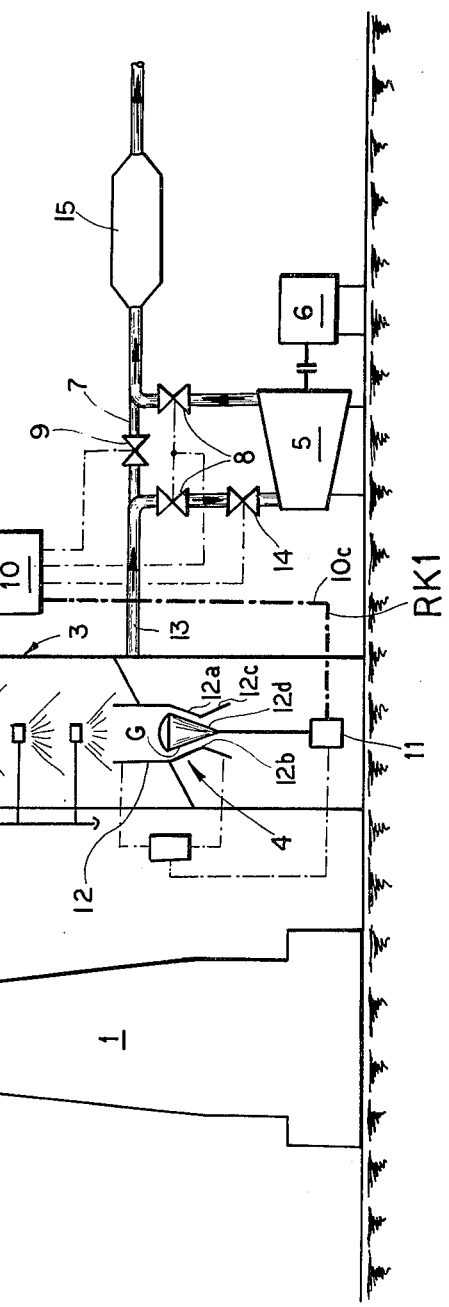
FIG. 1 is a flow diagram of a system embodying the present invention in which heavy lines represent the main gas flow and the effective portions of the control system during one phase of operation, i.e. when the operating state is in the region A of the diagram of FIG. 3.

The gas-cleaning installation shown in FIGS. 1 and 2 is generally similar to the apparatus described in the aforementioned copending application and prior patents, although the coarse-cleaning, cleaning-water-recirculating and like systems have not been illustrated here for the sake of simplicity.

Basically the system comprises a pressurized blast furnace 1 to the gas outlet 2 of which is connected a duct 2a which ultimately runs to a washing tower 3 provided with a prewasher 3a and an annular-gap (controlled-gap) scrubber 4.

The controlled-gap scrubber 4 is shown to have, downstream of washing zone 3a, a cylindrical duct 12 which converges in the direction of gas flow at 12a to a venturi constriction 12b before it diverges again at 12c. Within the ventury constriction there is provided throttle means in the form of a conical body 12d which defines an adjustable-width gap G, the body 12d being axially displaceable in the venturi constriction by a servomotor 11.

To the controlled-gap washer 4 there is connected, via a duct 13, an expansion turbine 5 which can be coupled to an energy-recovering device such as an electric generator 6. In accordance with the principles of the aforementioned applications and prior patents, a bypass 7 across the inlet and outlet of the turbine 5 is provided and has a valve 9. The usual turbine valves 8 are provided at the inlet and outlet of the turbine. An additional throttle valve 14 may also be provided at the inlet side of the turbine.

The gas then discharges through a droplet separator represented at 15.

Also in accordance with the earlier systems, the apparatus of the present invention includes a controller 10 for maintaining substantially constant the gas pressure in the outlet 2 of the pressurized blast furnace. The controller 10 can have a sensor represented by line 10b which responds to the pressure at the head of the blast furnace and which is connectable to the servocontroller 11 for varying the differential pressure across the washing gap.

The controlled-gap washer unit 4 can be constituted from a plurality of controlled-gap washers as long as the unit as a whole and the individual washers thereof are not functionally differentiated.

Downstream of the controlled-gap washer units 4 is only a single duct, namely the duct 13, into which all the washers of the unit discharge and which is provided with the expansion turbine 5 with its turbine valves 8 and the bypass 7 with its bypass valve 9.

The apparatus, whose basics have been shown in FIGS. 1 and 2, has an operating diagram as shown in FIG. 3. The numerical values, naturally, are only given by way of example for a practical embodiment of the invention. These numerical values however may be considered the best mode known to us at the present time for carrying out the invention in practice and indeed to be an optimum.

In the diagram the gas pressure in atmospheres has been plotted along the ordinate, i.e. the discharge pressure measured at the outlet 2 of the blast furnace. This discharge pressure is, of course, the pressure of the waste gas entering the cleaning installation of the present invention.

The gas volume per unit time has been plotted along the abscissa and thus the abscissa represents the volumetric rate of flow in appropriate units (cubic meters per hour) as indicated. As a result, the diagram can be termed a gas pressure/volume diagram.

Depending upon the structural parameters of the expansion turbine, the latter has a turbine-insertion characteristic curve TE and a turbine-operating characteristic curve TA between which a region A is defined.

The blast furnace 1 has a furnace-operating characteristic curve represented at H while the differential-pressure scrubber has a gas-cleaning characteristic curve GR which is parallel to the blast-furnace characteristic curve H and is spaced therefrom by a distance determined by the pressure differential across gap G. Thus, a transposed furnace operating characteristic curve HK can be considered to coincide with the gas-cleaning characteristic curve GR.

Thus, while the turbine-insertion characteristic curve TE and the turbine-operating characteristic curve TA define the region A, the corrected blast-furnace characteristic curve HK defines below the operating characteristic curve TA of the turbine a region B.

The operating point P of the apparatus, i.e. the particular pressure/volume conditions under which the system is operating, as long as the conditions are such as to enable energy recovery by the turbine, will lie in the region A or in the region B and can transit between these regions.

According to an essential of the invention, when the state parameters of the system correspond to an operating point P in the region A of the diagram, the pressure drop in the cleaning installation is effected within the controlled-gap washer 4 (depending upon the location of the point P) and additionally in the expansion turbine 5 while the controlled-gap washer regulates the gas pressure at the outlet 2 of the blast furnace in such a manner that the supplied gas volume corresponds to the requirements of the expansion turbine and to this gas pressure, the valve 9 in the bypass 7 being closed.

The turbine valves 8 are expendable under these conditions and need be used only during startup of the installation. The result is an operation of the system as shown by the heavy lines in FIG. 1. In this arrangement the pressure-regulating circuit illustrated at RK1 includes the input 10b from the blast furnace to the controller 10 and an output 10c from the controller to the servomotor 11 so that the position of body 12d is varied as a function of the blast-furnace pressure to maintain the same constant.

When the operating point P is in region B of the diagram, the turbine valves 8 also can be eliminated. In this state, valve 9 is opened and constitutes the control element of a modified pressure-regulating circuit RK2 shown in FIG. 2. The control system in this case, however, has two main but independent branches RK2 and RK3 as can be seen from FIG. 2. The branch RK2 includes the aforementioned input 10b to the controller 10 whose output 10d operates the variable-cross-section valve 9 directly so that the latter forms the control element for the back pressure at the blast furnace.

The independent circuit branch RK3 has inputs 30 and 31 to another controller 32, sensing the pressures on opposite sides of the gap and thus applying to the input of controller 32 a pressure differential which is used to operate the servomotor 11. It should be apparent that automatic control means may be provided for cutting out the pressure-regulating path RK1 and establishing the independent paths RK2 and RK3 and, conversely, cutting out the pressure-regulating paths RK2, RK3 and reestablishing path RK1 upon respective transitions of the operating point P from region A into region B and vice versa, such means responding to a rate monitor a pressure gauge at the outlet from the furnace. The branch path RK3 serves to optimize the gas-cleaning operation at the differential-pressure washed. The throttle valve 14 may be used for controlling the throughput so that additional adjustments in response to the other variables may be available.

FIG. 5 shows a system in which, instead of the throttle valve 14, the turbine 5' has adjustable stator or rotor vanes as represented at 14', the latter being shown connected to the controller 10 via a line 10a. It will be apparent that the turbine system of FIG. 5 can be substituted for the turbine arrangement of FIGS. 1 and 2.

Figure 4:
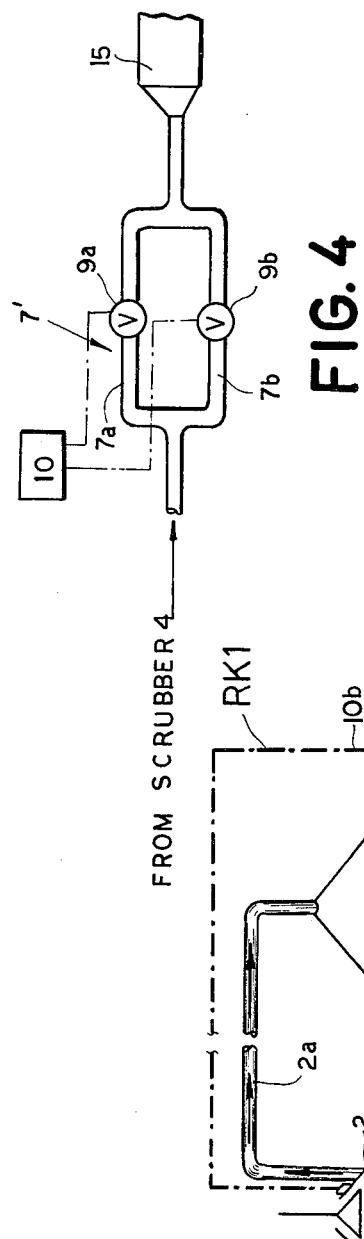
FIG. 4 is a fragmentary view of a modification of the system of FIGS. 1 and 2.

FIG. 4 shows a system in which the bypass is subdivided into two parallel paths 7a and 7b, each of which has a respective valve 9a and 9b connected by control lines to the controller 10.

One or the other or both of the valves 9a and 9b of the bypass 7' may be operating for maximum control of the throughput. It will be understood that elements of our copending applications listed above may be incorporated into the system as fully described in those applications without deviating from the substance of the present invention.

The FIGURES of the drawing and the foregoing description show the function of the gas-cleaning installation of the present invention in all operating states.

When during startup or for other reasons the expansion turbine 5 is not in operation, i.e. the system is operating in the region C or D of the diagram, the total control of the pressure at the outlet 2 of the high-pressure blast furnace 1 is effected in the controlled-gap washer 4. The valves 8 may be completely closed, valve 9 fully opened, and the control path RK1 established.

Assume then that the operating point P moves to one of the working regions of the diagram, i.e. region A or region B. Since energy recovery is now possible, the expansion turbine 5 is activated so that the pressure drop will develop at least in part in the expansion turbine. Control of the gas pressure at the head of the blast furnace 1 is effected via the controlled-gap washer 4 although in such manner as to ensure the supply of gas under controlled pressure for the expansion turbine. It should be noted that a minimum differential pressure is required for gas cleaning in the controlled-gap washer especially if the cleaning is to enable the gas to be passed through the expansion turbine. We have found that this is obtained with the control system operated in accordance with the present invention.

The waste gas which leaves the washing tower 3 entrains water droplets therewith. As noted in the last-mentioned copending application, these water droplets can be separated out within the expansion turbine 5 itself although it is preferred to provide an additional droplet separator 5. Advantageously the latter droplet separator is only introduced into the gas flow path when the expansion turbine 5 is shut down.

The turbine valve 8 functions only during startup or as close-down valves for the rapid shut down of the turbine and, for example, to briefly close it down when the expansion turbine has a runaway tendency or operating mode. In this case, the valve 9 or the valves 9a, 9b or at least one of them is opened so that the controlled-gap washer 4 performs the entire pressure-drop control for regulating the pressure at the outlet 2 of the blast furnace. The valves 8 or other valves may be provided to allow the turbine unit to be completely removed from the system for maintenance, replacement or the like.

Pressure control in accordance with the present invention is a function of the characteristics of the expansion turbine which determines the shape and location of the characteristic curves TE and TA. For each pressure condition ahead of the expansion turbine there is only one predeterminable gas quantity which can be used effectively in the turbine. The diagram in region A shows that the turbine can receive a somewhat greater quantity than can be supplied by the blast furnace. To adjust the throughput of the expansion turbine or the particular pressure which must be maintained in the outlet of the blast furnace it is important in accordance with the invention to throttle the pressure head of the expansion turbine somewhat. This is effected in the controlled-gap washer 4, thereby ensuring simultaneously an effective cleaning of the gas. As the turbine-operating characteristic curve TA and the blast-furnace characteristic curve H approach one another, the controlled-gap washer is opened increasingly until at the intersection of the two, it is sufficiently open to introduce practically no pressure drop in addition that provided by the expansion turbine which corresponds to that required by the blast furnace. Naturally, at this point the pressure differential across the annular-gap washer is practically zero and cleaning is no longer efficient. Consequently, at this point the circuit RK3 is brought into play to provide differential-pressure control when the differential pressure falls below the minimum required for effective cleaning. Should the resulting differential pressure require adjustment to maintain the overall pressure constant, valve 9 is brought into play (circuit RK2). The system also operates in this fashion when a plurality of bypass paths are used.

Should the operating point P pass into the region C or D and the turbine speed fall below the desired value, the turbine is cut off. The pressure drop is then controlled exclusively by the controlled-gap washer. Naturally, other components of the control system may be provided for reacting to emergency pressure drops and the like in a conventional way.

We claim:

1. A method of operating a gas-cleaning plant in which:
    a scrubber having adjustable throttle means downstream of a gas-washing zone, adapted to generate a controllable pressure differential across a gap of variable width, is connected to a gas outlet of a high-pressure blast furnace,
    an expansion turbine for the recovery of energy is connected to the scrubber downstream of said gap;
    a bypass is connected across the turbine downstream of said gap and is provided with a control valve adjustable to vary the discharge pressure of the blast furnace;
    a first control circuit RK1 responsive to the discharge pressure of the blast furnace is provided to operate said throttle means for varying the width of said gap;
    a second control circuit RK2 responsive to the discharge pressure of the blast furnace is provided to operate said control valve; and
    a third control circuit RK3 responsive to the pressure differential across said gap is provided to adjust said throttle means independently of said discharge pressure;
    said method comprising the steps of:
    (a) establishing operating regions A and B on a diagram for the plant, having the form of FIG. 3, in which the discharge pressure of the blast furnace is plotted along the ordinate and volume rate of flow of gas from the blast furnace is plotted along the abscissa, region A being defined between a turbine-insertion characteristic curve TE representing pressures and volumes below which the turbine is ineffective for energy recovery and by a turbine-operating characteristic curve TA representing pressures and volumes beyond which the turbine is no longer able to consume the total gas quantity generated by the blast furnace, region B being defined between said turbine-operating characteristic curve TA and a gas-cleaning characteristic curve GR which parallels a furnace-operating characteristic curve H and is transposed from the latter by said pressure differential;
    (b) controlling the discharge pressure of said blast furnace when the plant has an operating point in said region A, with the aid of said throttle means, solely by varying the width of said gap by said first control circuit RK1 in response to said discharge pressure while keeping said second and third control circuits RK2, RK3 inoperative and blocking said bypass with the aid of said control valve whereby all the gas traversing said scrubber flows through said turbine;
    (c) controlling the discharge pressure of said blast furnace when said operating point is in said region B by varying the cross-section of said bypass, with the aid of said control valve, by said second control circuit RK2 in response to said discharge pressure while keeping said first control circuit RK1 inoperative and continuing the flow of gas from said scrubber through said turbine; and
    (d) while said operating point is in said region B, varying the width of said gap by said third control circuit RK3 in response to said pressure differential and independently of said discharge pressure;
    said first, second and third control circuits RK1, RK2, RK3 being selectively activated by a common controller responsive to said discharge pressure and to said volume rate of flow.

2. An apparatus for cleaning an exhaust gas issuing from an outlet of a high-pressure blast furnace, comprising:
    a scrubber connected to said outlet and provided with adjustable throttle means forming a gap of variable width downstream of a gas-washing zone for generating a controllable pressure differential across said gap;
    an expansion turbine for the recovery of energy connected to said scrubber downstream of said gap;
    a bypass connected across said turbine downstream of said gap and provided with a control valve adjustable to vary the discharge pressure of said blast furnace;
    a first control circuit RK1 responsive to said discharge pressure for operating said throttle means to vary the width of said gap;
    a second control circuit RK2 responsive to said discharge pressure for operating said control valve;

a third control circuit RK3 responsive to said pressure differential for adjusting said throttle means independently of said discharge pressure; and common control means responsive to said discharge pressure and to the volume rate of flow of the exhaust gas from said outlet for selectively activating said first, second and third control circuits according to the location of an operating point of the apparatus on a diagram having the form of FIG. 3 in which said discharge pressure is plotted along the ordinate and said volume rate of flow is plotted along the abscissa, said diagram having a region A defined between a turbine-insertion characteristic curve TE representing pressures and volumes below which the turbine is ineffective for energy recovery and by a turbine-operating characteristic curve TA representing pressures and volumes beyond which the turbine is no longer able to consume the total gas quantity generated by said blast furnace, said diagram further having a region B defined between said turbine-operating characteristic curve TA and a gas-cleaning characteristic curve GR which parallels a furnace-operating characteristic curve H and is transposed from the latter by said pressure differential;

said control means activating only said first control circuit RK1 when said operating point is in said region A to control said discharge pressure with the aid of said throttle means solely by varying the width of said gap in response to said discharge pressure while blocking said bypass with the aid of said control valve whereby all the gas traversing said scrubber flows through said turbine;

said control means activating said second and third control circuits RK2 and RK3 to the exclusion of said first control circuit RK1 when said operating point is in said region B to control said discharge pressure by varying the cross-section of said bypass with the aid of said control valve in response to said discharge pressure, with continuing flow of gas from said scrubber through said turbine, while also varying the width of said gap in response to said pressure differential and independently of said discharge pressure.

* * * * *